United States Patent Office 2,836,596
Patented May 27, 1958

2,836,596
PROCESS FOR THE PRODUCTION OF 4-AMINO-5'-BROMO-ANTHRAQUINONE-2,1-(N)-1',2'-(N)-BENZENE-ACRIDONE

Fritz Baumann, Leverkusen-Bayerwerk, Germany, assignor to Farbenfabriken Bayer Aktiengesellschaft, Leverkusen, Germany, a corporation of Germany No Drawing. Application June 1, 1955
Serial No. 512,559

Claims priority, application Germany June 5, 1954

1 Claim. (Cl. 260—277)

This invention relates to a process for the production of 4-amino-5'-bromo-anthraquinone-2,1-(N)-1',2'-(N)-benzene-acridone.

The 1-anildo-4-amino-2'-carboxy-4'-halogen-anthraquinone-3-sulphonic acid necessary for the production of 4-amino-5'-bromo-anthraquinone-2,1-(N)-1',2'-(N)-benzene acridone has hitherto been obtained in accordance with the equation:

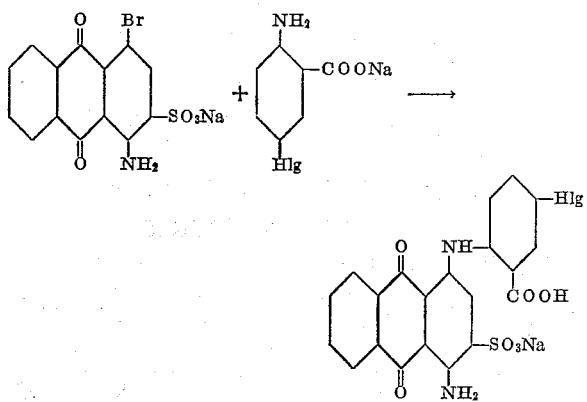

by reacting a 1-bromo-4-amino-anthraquinone-3-sulphonic acid salt with a 2-amino-5-halogen-benzoic acid. The 4-amino-5'-chloro-anthraquinone-2,1-(N) - 1',2' - (N)-benzene-acridone was prepared by treating the reaction product with concentrated sulfuric acid etc. It is also possible to obtain the corresponding and formerly unknown bromine derivative. In both cases, therefore, it has been necessary to use a 2-amino-5-halogen-benzoic acid, which is not readily available on a technical scale.

It is an object of the present invention to provide a process for the production of 4-amino-5'-bromo-anthraquinone-2,1-(N)-1',2'-(N)-benzene-acridone.

A further object is to provide a process for the above compound in which readily available compounds can be used. Other objects will appear hereinafter.

These objects are attained in accordance with the present invention by treating the already known and readily available 1-anilido-4-amino-2'-carboxy-anthraquinone-3-sulphonic acid which is obtained in known manner by reaction of 1-bromo-4-amino-anthraquinone-3-sulphonic acid with anthranilic acid with the calculated amount of bromine in concentrated sulphuric acid, weak oleum or chloro-sulphonic acid at a low temperature (about 0 to 30° C.) in the presence or absence of catalysts usually used for the bromination.

Since the hydrogen bromide being formed during the bromination is immediately oxidized by the sulphuric acid, only 1 gram-atom of bromine per mol of starting material is necessary for the bromination.

It was surprising that the bromination proceeds smoothly and results exclusively in a monobromine derivative. It is well-known that this is not the case when anthranilic acid is brominated.

For the conversion into 4-amino-5'-bromo-anthraquinone-2,1-(N)-1',2'-(N)-benzene-acridone.

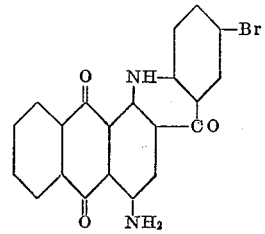

by the process of the present invention, the 1-anilido-4-amino-2'-carboxy-4'-bromo-anthraquinone-3 - sulphonic acid produced as described above is heated, preferably to 50 to 100° C., in chlorosulphonic acid, concentrated sulphuric acid or weak oleum. The ring then closes and the sulphonic acid group splits off. The acridone ring closure can, however, also be carried out together with the bromination in one operation. With this method of working, it is advisable to increase the concentration of sulphuric acid after halogenation is completed, for example by adding oleum.

Accordingly the present invention provides a process for the production of 4-amino-5'-anthraquinone-2,1-(N)-1',2'-(N)-benzene-acridone wherein 1-anilido-4-amino-2'-carboxy-anthraquinone-3-sulphonic acid is treated in concentrated sulphuric acid, weak oleum or chlorosulphonic acid with the calculated amount of bromine, and the 1-anilido-4-amino-2'-carboxy-4'-bromo - anthraquinone-3-sulphonic acid which is formed is converted into the 4-amino-5'-bromo-anthraquinone-2,1-(N)-1',2'-(N) - benzene-acridone by heating in concentrated sulphuric acid, weak oleum or chloro-sulphonic acid.

The acridone can be isolated either as the sulphate or by further dilution of the melt with water.

The economy of this process is not based solely on the replacement of the expensive 5-halogen-anthranilic acid by the less expensive anthranilic acid, but also on the fact that only a smaller excess of the latter is necessary in the dyestuff condensation with 1-bromo-4-amino-anthraquinone-3-sulphonic acid, which takes place with yields of 93 to 95% of the theoretical.

The 4-amino-5'-bromo-anthraquinone-2,1-(N)-1',2'-(N)-benzene-acridone is a valuable dyestuff intermediate and can be used instead of the corresponding chloro compound.

The following examples further illustrate the invention without, in any way, limiting it.

*Example 1*

137 kg. of 1-anilido-4-amino-2'-carboxy-anthraquinone-3-sulphonic acid are introduced into 1370 kg. of 98% sulphuric acid at 10 to 15° C., the said substance being added slowly in order to avoid the formation of lumps. After the said sulphonic acid has completely dissolved, 25 kg. of bromine are run in gradually over a period of four hours and at the same temperature. Since the bromination is carried out with the use of only half a mol of bromine, escape of hydrogen bromide must be prevented and the apparatus is closed. A slight positive pressure is set up during the bromination. After the bromine has been added, the temperature is allowed to rise to 20 to 25° C. and the mixture is stirred until the bromine atmosphere above it has disappeared and it is no longer possible to detect any hydrogen bromide, this taking approximately ten hours. At the end of the operation, neither bromine nor hydrogen bromide should be present and a sample should only have an odor of sulphur dioxide.

The prepared bromination product is forced into 3700 liters of water and 30 liters of bisulphite solution, heated for one hour to 95 to 100° C. and expressed or filtered off with suction while hot. If necessary, further 2000 liters of water can be added before filtering with suction. The filter cake is washed with 2% hydrochloric acid at a temperature of 50° C. until the discharging liquid is clear so as to remove the sulphuric acid. Finally, it can be rinsed once with cold water and dried at 100° C.

The 1-anilido-4-amino-2'-carboxy-4'-bromo-anthraquinone-3-sulphonic acid is obtained as violet-red needles which dissolve with a clear blue color in water, bluish-green in concentrated sulphuric acid and green in sulphoboric acid. It dyes wool in clear blue shades having good fastness to light. The yield is 156 kg. of 1-anilido-4 - amino - 2' - carboxy - 4' - bromo - anthraquinone - 3-sulphonic acid.

25.9 kg. of the dry 1-anilido-4-amino-2'-carboxy-4'-bromo-anthraquinone-3-sulphonic acid are introduced without cooling into 200 kg. of 2% oleum. Free $SO_3$ should be still present after the introduction has taken place. The mixture is then heated to 100° C. The solution turns brown, and the sulphonic acid group splits off and the acridone ring closes. The temperature is maintained at this level for about one hour until a sample worked up in water shows neither a neutral nor an ammoniacal discharging liquid upon being washed with hot water. By adding 80 liters of water at 90 to 100° C., the sulphate is obtained in brown crystals. The substance is filtered with suction and washed with 70% sulphuric acid until the discharging liquid is clear. The filter cake is washed until neutral and dried.

Alternatively, the substance can be introduced directly into water immediately after settling.

The yield is 19.3 kg. of 4-amino-5'-bromo-anthraquinone-2,1-(N)-1',2'-(N)-benzene acridone.

The bromine content found is 18.9%; calculated: 19.1%.

The amino-bromo-acridone is sparingly soluble in organic solvents. After being recrystallized from nitrobenzene, it is obtained in bluish-black needles. The color of its solution in concentrated sulphuric acid is orange-brown, which is only very slightly changed upon addition of formaldehyde or boric acid. It dyes cotton in blue shades from a violet vat.

Example 2

The bromination of 1-anilido-4-amino-2'-carboxy-anthraquinone-3-sulphonic acid is carried out in exactly the same manner as described in Example 1, except that on completion $SO_2$ or a current of dry air is briefly passed through the melt in order to remove small amounts of bromine or hydrogen bromide. The melt is then mixed with 740 kg. of 20% oleum so that about 1% of oleum is present before heating takes place. The solution with a slight odor is now heated to 100° C. and maintained at this temperature for one hour. At 90 to 100° C. the melt is diluted with 820 liters of water, cooled to 25° C. and the resulting well-crystallized 4-amino - 5 - bromo - anthraquinone - 2,1 - (N) - 1',2'-(N)-benzene acridone is filtered off with suction and washed finally with 70% sulphuric acid. The filter cake is washed until neutral and dried.

The yield is 110 kg. of 4-amino-5'-bromo-anthraquinone-2,1-(N)-1',2'-(N)-benzene acridone.

I claim:

A process for the production of 4-amino-5'-bromo-anthraquinone 2,1-(N)-1',2'-(N)-benzene-acridone which comprises reacting 1 mole of 1-anilido-4-amino-2'-carboxy-anthraquinone-3-sulphonic acid in a member selected from the group consisting of concentrated sulphuric acid, weak oleum and chlorosulphonic acid at a temperature of about 0 to 30° C. with 1 gram-atom of bromine, and converting the 1-anilido-4-amino-2'-carboxy-4'-bromo-anthraquinone-3-sulphonic acid formed by heating with a member selected from the group consisting of concentrated sulphuric acid, weak oleum and chlorosulphonic acid into 4-amino-5'-bromo-anthraquinone-2,1-(N)-1', 2'-(N)-benzene-acridone and recovering the latter.

References Cited in the file of this patent

UNITED STATES PATENTS

| | | |
|---|---|---|
| 1,207,981 | Neresheimer | Dec. 12, 1916 |
| 1,903,891 | Bruck | April 18, 1933 |
| 2,185,140 | Bauer | Dec. 26, 1939 |
| 2,188,104 | Baumann et al. | Jan. 23, 1940 |
| 2,507,479 | Max et al. | May 9, 1950 |
| 2,623,047 | Zerweck | Dec. 23, 1952 |